(12) United States Patent
Hayakawa et al.

(10) Patent No.: US 8,665,103 B2
(45) Date of Patent: Mar. 4, 2014

(54) SEAT HAVING OCCUPANT DETECTING FUNCTION AND OCCUPANT DETECTION DEVICE

(75) Inventors: Hideyuki Hayakawa, Nishio (JP); Shoichi Yamanaka, Anjo (JP); Toshio Hosokawa, Anjo (JP)

(73) Assignee: Denso Corporation, Kariya (JP)

( * ) Notice: Subject to any disclaimer, the term of this patent is extended or adjusted under 35 U.S.C. 154(b) by 1053 days.

(21) Appl. No.: 12/658,846

(22) Filed: Feb. 16, 2010

(65) Prior Publication Data

US 2010/0207773 A1 Aug. 19, 2010

(30) Foreign Application Priority Data

Feb. 18, 2009 (JP) .................. 2009-035230
Oct. 16, 2009 (JP) .................. 2009-239382

(51) Int. Cl.
*G08B 21/00* (2006.01)

(52) U.S. Cl.
USPC ........... 340/667; 340/500; 340/540; 340/665; 340/666

(58) Field of Classification Search
None
See application file for complete search history.

(56) References Cited

U.S. PATENT DOCUMENTS

| 6,345,839 | B1* | 2/2002 | Kuboki et al. | 280/735 |
| 6,428,095 | B1* | 8/2002 | Hirata | 297/217.3 |
| 6,494,284 | B1* | 12/2002 | Cooper | 180/282 |
| 6,629,445 | B2 | 10/2003 | Yamanaka et al. | |
| 7,216,895 | B2 | 5/2007 | Hattori et al. | |
| 2005/0090958 | A1* | 4/2005 | Hattori et al. | 701/45 |
| 2006/0109091 | A1* | 5/2006 | Rittmueller et al. | 340/426.26 |
| 2007/0001499 | A1* | 1/2007 | Smith | 297/362.13 |
| 2007/0200721 | A1* | 8/2007 | Stanley et al. | 340/667 |
| 2007/0241895 | A1* | 10/2007 | Morgan | 340/561 |
| 2008/0046152 | A1 | 2/2008 | Ohtake et al. | |
| 2008/0176466 | A1* | 7/2008 | Parten | 441/65 |

FOREIGN PATENT DOCUMENTS

| JP | 11-011256 | 1/1999 |
| JP | 2002-022577 | 1/2002 |
| JP | 2005-88738 | 4/2005 |
| JP | 2006-062562 | 3/2006 |
| JP | 2007-055603 | 3/2007 |
| JP | 2007-101489 | 4/2007 |
| JP | 2007-218646 | 8/2007 |

OTHER PUBLICATIONS

Office action dated Feb. 15, 2011 in corresponding Japanese Application No. 2009-239382 with English translation thereof.

* cited by examiner

*Primary Examiner* — Benjamin C Lee
*Assistant Examiner* — Curtis King
(74) *Attorney, Agent, or Firm* — Harness, Dickey & Pierce, PLC

(57) ABSTRACT

A seat has an occupant detecting function and is installed in a vehicle. The seat includes a seating portion, a capacitance sensor, a controller, and a supporting member. The seating portion is adapted to support buttocks and thighs of an occupant of the vehicle. The seating portion includes a seat cushion therein. The capacitance sensor is attached to the seating portion. The controller is installed to the seating portion and configured to apply a voltage to the sensor and to detect a value of an electric current, which passes through the sensor because of the voltage. The supporting member supports the controller from a lower side thereof in a vertical direction, such that the controller is rotatable about the supporting member when the seating portion is pressed by the occupant.

15 Claims, 12 Drawing Sheets

| A | B | C | D |
|---|---|---|---|
| CAPACITANCE DETECTION DETERMINATION | LOAD DETECTION DETERMINATION | DETERMINATION | AIRBAG LAMP |
| ON | ON | ON | AIRBAG ON LAMP TURNED ON |
| ON | OFF | ON | AIRBAG ON LAMP TURNED ON |
| OFF | ON | OFF | AIRBAG OFF LAMP TURNED ON |
| OFF | OFF | OFF | AIRBAG OFF LAMP TURNED ON |
| VACANT | ON | | |
| VACANT | OFF | VACANT | BOTH LAMPS TURNED OFF |

SEAT HAVING OCCUPANT DETECTING FUNCTION AND OCCUPANT DETECTION DEVICE

CROSS REFERENCE TO RELATED APPLICATION

This application is based on and incorporates herein by reference Japanese Patent Application No. 2009-35230 filed on Feb. 18, 2009 and Japanese Patent Application No. 2009-239382 filed on Oct. 16, 2009.

BACKGROUND OF THE INVENTION

1. Field of the Invention

The present invention relates to a seat having an occupant detecting function, and an occupant detection device.

2. Description of Related Art

Conventionally, a capacitance type occupant detection device is known as an occupant detection device for detecting an occupant seated on a seat of a vehicle. According to JP-A-11-11256, for example, a capacitance type sensor having an electrode is disposed on an upper surface of a seating portion of a seat, and whether an occupant is seated on the seat is detected based on a variation of a value of an electric current generated as a result of application of a voltage to the capacitance type sensor. In addition, in the publication of JP-A-11-11256, a control part for applying the voltage and for detecting the variation of the electric current value is provided on a lower surface of the seating portion.

However, as specified by the technology described in JP-A-11-11256, the capacitance type sensor is disposed at an upper part of the seating portion, and the control part is disposed on a front side of the seat under a seat cushion. Therefore, an extended portion for serving as an electric connection between the capacitance type sensor and the control part inevitably becomes long, and passes along a front end of the seating portion.

Since the occupant detection device is configured in the above-described manner, the extended portion passing along the front end of the seating portion may receive noise that is irrelevant to whether the occupant is seated on the seat. For instance, capacitance may vary with a change of a position of a body part of the occupant below his/her knee, which may reduce accuracy of the occupant detection.

SUMMARY OF THE INVENTION

The present invention addresses at least one of the above disadvantages.

According to the present invention, there is provided a seat having an occupant detecting function and installed in a vehicle. The seat includes a seating portion, a capacitance sensor, a controller, and a supporting member. The seating portion is adapted to support buttocks and thighs of an occupant of the vehicle. The seating portion includes a seat cushion therein. The capacitance sensor, is attached to the seating portion. The controller is installed to the seating portion and configured to apply a voltage to the sensor and to detect a value of an electric current, which passes through the sensor because of the voltage. The supporting member supports the controller from a lower side thereof in a vertical direction, such that the controller is rotatable about the supporting member when the seating portion is pressed by the occupant.

According to the present invention, there is also provided a seat having an occupant detecting function and installed in a vehicle. The seat includes a seating portion, a backrest portion, a capacitance sensor, and a controller. The seating portion is adapted to support buttocks and thighs of an occupant of the vehicle. The seating portion includes a seat cushion therein. The backrest portion is adapted to support a back of the occupant. The capacitance sensor is attached to the seating portion. The controller is installed to the seating portion and configured to apply a voltage to the sensor and to detect a value of an electric current, which passes through the sensor because of the voltage. The controller is located in the seat cushion of the seating portion below the backrest portion in a vertical direction.

Furthermore, according to the present invention, there is provided an occupant detection device for a vehicle having a seat on which an occupant of the vehicle is seatable. The seat includes a seating portion that supports buttocks and thighs of the occupant, and a backrest portion that supports a back of the occupant. The device is disposed in the seating portion and includes a capacitance sensor and a controller. The capacitance sensor is adapted to be attached to the seating portion. The controller is configured to apply a voltage to the sensor and to detect a value of an electric current, which passes through the sensor because of the voltage. The sensor includes an electrode portion and an extended portion that projects from the electrode portion and is thereby electrically connected between the electrode portion and the controller. A longitudinal direction of the controller is perpendicular to a direction in which the extended portion projects.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION (First Embodiment)

A first embodiment of the invention will be described below. A vehicle seat 1 illustrated in FIG. 1 corresponds to an example of a seat with an occupant detecting function. The vehicle seat 1 is a seat (more specifically, a passenger seat) disposed in a vehicle. More specifically, the vehicle seat 1 is fixed to a chassis of the vehicle such that a front of the vehicle seat 1 (i.e., left side in FIG. 1) coincides with a front of the vehicle, and that an upper side of the vehicle seat 1 (i.e.; upper direction in FIG. 1) coincides with an upper side of the vehicle.

The front, rear, upper side, lower side, right side, and left side of the vehicle seat 1 indicate a front, rear, upper side, lower side, right side, and left side, respectively, with the vehicle seat 1 as their reference. More specifically, provided that a surface of a seating portion 3 with which buttocks and thighs of an occupant are in direct contact is referred to as a seating surface, a direction in which the seating surface faces is referred to as the upper side of the vehicle seat 1, and a direction which is opposite from the upper side is referred to as the lower side of the vehicle seat 1. If the seating surface does not entirely face in the same direction, a direction in which a central part of the seating surface faces may be referred to as the upper side of the vehicle seat 1, or a direction in which the seating surface faces averagely may be referred to as the upper side of the vehicle seat 1. Furthermore, in a plane perpendicular to a surface (hereinafter referred to as a backrest surface) of a backrest portion 4 with which a back of the occupant is in direct contact, a direction parallel to the seating surface is referred to as a front-rear direction of the vehicle seat 1. A side of the front-rear direction on which the backrest surface faces is referred to as the front of the vehicle seat 1, and an opposite direction of the front is referred to as the rear of the vehicle seat 1. In the following description, the front, the rear, the upper side, the lower side, the right side, and the left side of the vehicle seat 1 are referred respectively to simply as a front, rear, upper side, lower side, right side, and left side.

Figure 1:
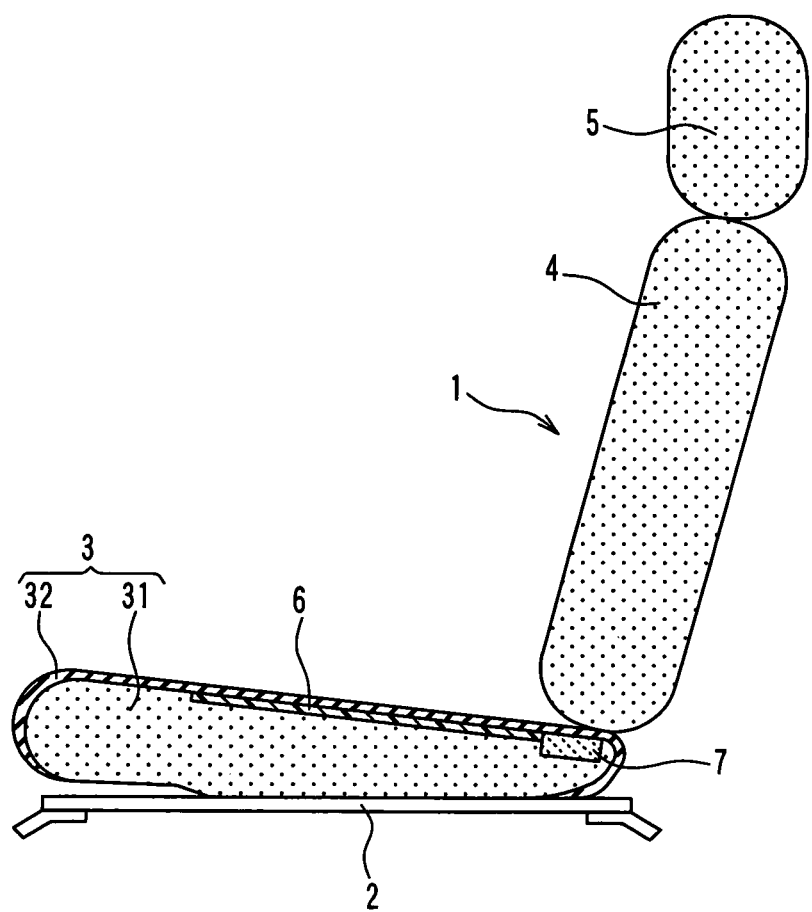
FIG. 1 is a cross-sectional view illustrating a vehicle seat in accordance with a first embodiment of the invention.

As illustrated in FIG. 1, the vehicle seat 1 includes a seat frame 2, the seating portion 3, the backrest portion 4, a head restraint 5, a sensor mat portion 6, and a control part (controller) 7. The seat frame 2 is a metal member, and fixed and electrically connected to a body of the vehicle (fixed on the ground) by a bolt or the like. The vehicle seat 1 is fixed to the chassis through this fixation.

The seating portion 3 is a member that 3 is fixed to the seat frame 2 for supporting the buttocks and thighs of the occupant seated on the vehicle seat 1. The seating portion 3 includes a seat cushion 31 and a seat cover 32. The seat cushion 31 is a widely known elastic member for supporting the occupant seated on the vehicle seat 1 by elastic force, and made of polyurethane, for example. The seat cover 32 is a widely known cover that covers an upper part and side part of the seat cushion 31.

Thickness of the seating portion 3, which is structured in the above-described manner, in lower and upper directions decreases from a seat front end to a seat rear end. In other words, the seating portion 3 tapers off toward the rear. The reason why the seating portion 3 is formed in the above-described manner is that the seat cushion 31 is formed such that thickness of the seat cushion 31 in the lower and upper directions decreases from the front to the rear.

The backrest portion 4 is a member for supporting the back of the occupant seated on the vehicle seat 1. The head restraint 5 is a member for supporting a head portion of the occupant seated on the vehicle seat 1. Both the backrest portion 4 and the head restraint 5 are fixed, directly or indirectly via the seating portion 3, to the seat frame 2.

The sensor mat portion 6 and the control part 7 are attached to the seating portion 3 near the seating surface (i.e., upper surface) of the seating portion 3. The sensor mat portion 6 is a member that has a shape of a film and outputs a signal, which is in accordance with whether the occupant is seated on the seating portion 3, to the control part 7. The control part 7 detects whether the occupant is seated on the vehicle seat 1 based on the signal from the sensor mat portion 6, and outputs a signal in accordance with a result of the detection to a vehicle-side device via a sub harness. The vehicle-side device to which the signal is outputted is, for instance, an airbag electronic control unit (ECU). In addition, an airbag, an airbag ON lamp, and an airbag OFF lamp are connected to the airbag ECU.

Figure 2:
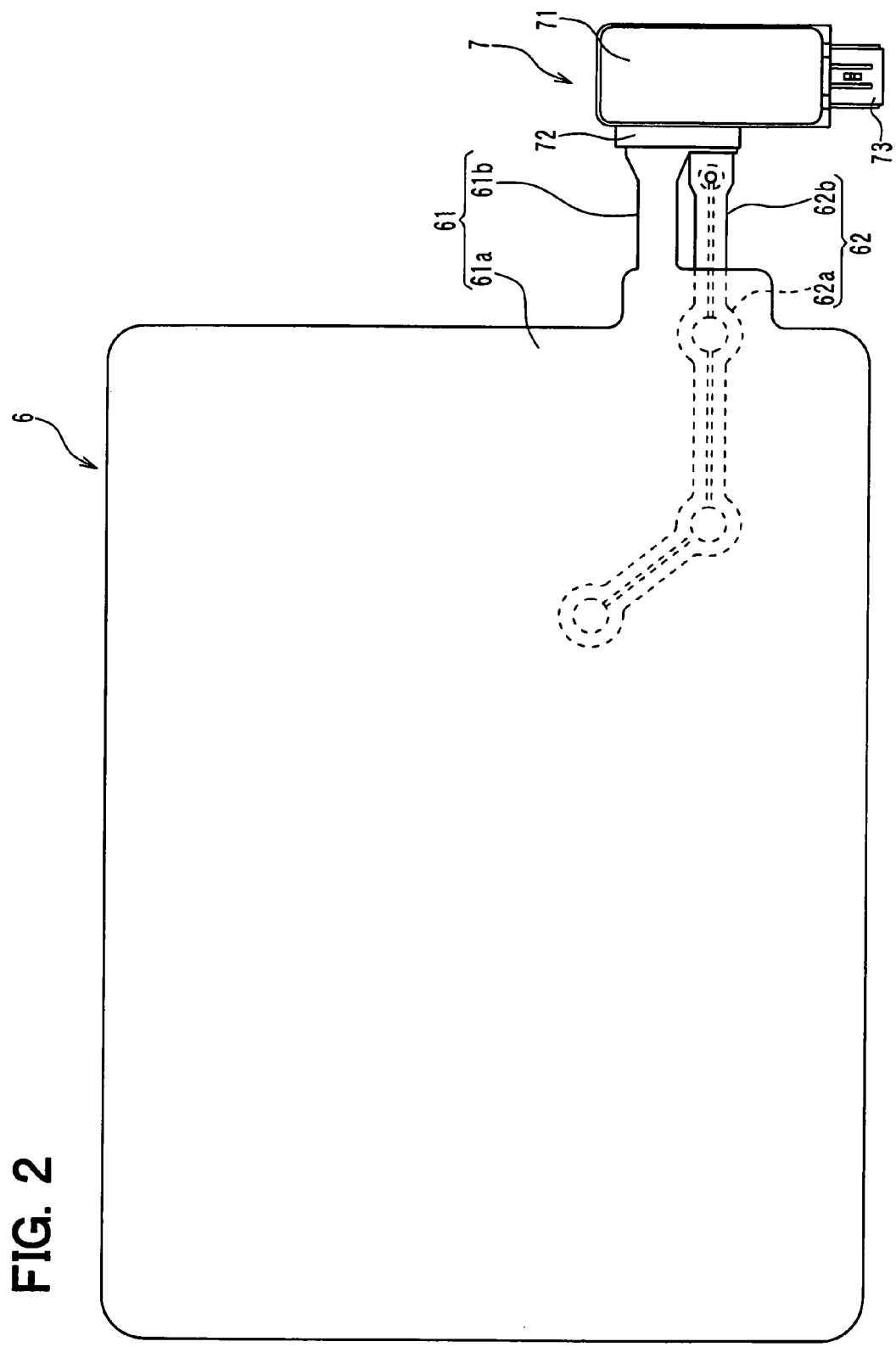
FIG. 2 is a plan view illustrating a sensor mat portion and a control part in accordance with the first embodiment.
Figure 3:
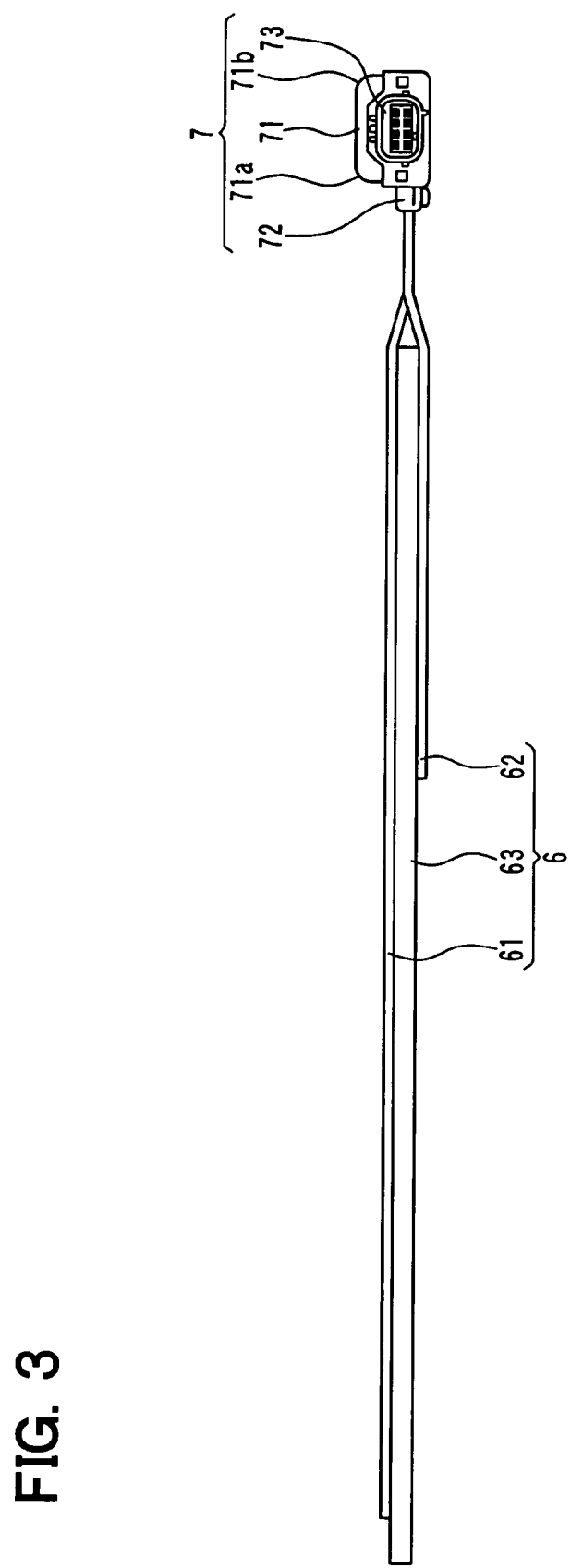
FIG. 3 is a side view illustrating the sensor mat portion and the control part in FIG. 2.

With reference to FIGS. 2 and 3, configurations of the sensor mat portion 6 and the control part 7 will be described in detail below.

As illustrated in these drawings, a capacitance type sensor 61 having a shape of a film is attached on one surface of a urethane pad 63, and a load detection sensor 62 having a shape of a long and thin film is attached on the other surface of the urethane pad 63.

The capacitance type sensor 61 is a member for detecting the occupant seated or an object placed on the vehicle seat 1 by a capacitive sensing method. The capacitive sensing method is a method whereby the detection object is detected by detecting capacitance (or impedance) of a persons or object (hereinafter referred to as a detection object) that exists on the seating portion 3. The capacitance type sensor 61 includes an electrode portion 61a and an extended portion 61b.

The electrode portion 61a is a member having a shape of a generally rectangular film with a film such as a thin polyethylenenaphthalate (PEN) serving as a base member. The electrode portion 61a includes a main electrode and a guard electrode which are not shown. The main electrode and the guard electrode are metal (e.g., carbon or aluminum) applied to a surface of the base member.

The main electrode is disposed on the surface of the base member. The guard electrode is disposed on a surface of the base member, which is opposite from the main electrode, to be opposed to the main electrode with the base member therebetween. Surfaces of the main electrode and the guard electrode are covered with a sheet-like dielectric member (e.g., thin PEN) so that the main and guard electrodes do not come into direct contact with a portion of the seating portion 3 other than the capacitance type sensor 61.

The extended portion 61b is a member that is formed integrally with the electrode portion 61a and has a shape of a long and thin film, and projects from a position on one side of the electrode portion 61a that is shifted from the center of the one side in a direction perpendicular to the one side. An end portion of the extended portion 61b in its longitudinal direction, which is opposite from an end portion of the extended portion 61b that is connected to the electrode portion 61a, is connected to the control part 7.

Similar to the electrode portion 61a, a film such as thin PEN is used as a base member of the extended portion 61b as well. The base member of the extended portion 61b is formed as a single member together with the base member of the electrode portion 61a. The extended portion 61b includes wiring parts (not shown). These wiring parts are metal (e.g., carbon or aluminum) applied to a surface of the base member. These wiring parts extend from one end portion of the extended portion 61b to the other end portion thereof. The wiring parts are respectively in electrical contact with the main and guard electrodes in the electrode portion 61a and in electrical contact with the control part 7 at the end portion of the extended portion 61b close to the control part 7.

Therefore, electric connection between the main electrode and the guard electrode of the electrode portion 61a, and the control part 7 is made through the extended portion 61b. As a result, the capacitance type sensor 61 and the control part 7 are connected directly (i.e., without, for example, a shielded cable therebetween).

Surfaces of the wiring parts of the extended portion 61b are covered with a sheet-like dielectric member (e.g., thin PEN) so that the main and guard electrodes do not come into direct contact with a portion of the seating portion other than the capacitance type sensor 61.

The base member of the capacitance type sensor 61 is produced by cutting off two or more base members from a large sheet of film. For this reason, as a length of the extended portion 61b in its projecting direction relative to the electrode portion 61a having a rectangular shape is larger, yields of the base members (i.e., yields of the capacitance type sensors 61) are further reduced, so that material costs wastefully increase.

The load detection sensor 62 having a shape of a film includes a switch portion 62a and an extended portion 62b.

The switch portion 62a is a film-shaped member, which is disposed to overlap with the main electrode of the electrode portion 61a. The switch portion 62a includes a seating sensor switch, such as a widely known membrane switch, and a resistor. The seating sensor switch and resistor are connected between the extended portion 62b and a ground electrically in series. The seating sensor switch is turned off when a load is not applied thereto, and turned on when a load is applied.

The seating sensor switch of the switch portion 62a is arranged in advance in such a position that when the load detection sensor 62 is disposed on the seating portion 3, the seating sensor switch is located in a position that is shifted from the center of the seating portion 3 in a direction between the right and left sides by about a quarter of a length of the seating portion 3 in this right-left direction. This is because the seating sensor switch detects not only the seating of an adult on the seating portion 3 but also a placement of a child restraint system (CRS) on the seating portion 3.

Accordingly, the seating sensor switch is turned on if the occupant is seated or if the CRS is placed, and turned off when the occupant is not seated, nor is the CRS placed (i.e., when the seating portion 3 is vacant).

The extended portion 62b is a film-shaped member that is formed integrally with the switch portion 62a, and electrically connected to the seating sensor switch and the resistor of the switch portion 62a. The extended portion 62b projects from the electrode portion 61a, and an end portion of the projecting portion of the extended portion 62b is electrically connected to the control part 7. As a consequence, a direct connection (i.e., without, for example, a shielded cable therebetween) is made between the seating sensor switch and the resistor of the load detection sensor 62, and the control part 7.

A position of the electrode portion 61a from which the extended portion 62b projects is adjacent to a position of the electrode portion 61a from which the extended portion 61b projects. In other words, a side of the electrode portion 61a, from which the extended portion 62b projects, coincides with a side of the electrode portion 61a, from which the extended portion 61b projects. A position of the above-described side from which the extended portion 62b projects is located on the same side as the extended portion 61b projects, relative to the center of the above side.

The urethane pad 63 is a dielectric member between the capacitance type sensor 61 and the load detection sensor 62.

The control part 7 includes a control part main body 71; a sensor connector 72, and a sub harness connector 73. The control part main body 71 is constituted of an internal circuit and a housing accommodating and protecting the internal circuit. The internal circuit includes an oscillating circuit that generates a fixed high-frequency voltage to be applied to the capacitance type sensor 61, a current sensing resistor that detects a value of an electric current flowing through the electrode portion 61a of the capacitance type sensor 61, and a seating detection circuit that detects whether the seating sensor switch of the load detection sensor 62 is turned on or off. The internal circuit further includes a determination circuit.

The determination circuit outputs to the airbag ECU a signal in accordance with a detection result by the above current sensing resistor for the capacitance type sensor 61 and a detection result by the above seating detection circuit for the load detection sensor 62. Operations of this group of circuits will be described below.

The determination circuit first determines whether no one is seated (i.e., the vehicle seat 1 is vacant), the CRS is attached, or an adult is seated on the vehicle seat 1 based on the detection result by the current sensing resistor for the capacitance type sensor 61.

Figure 4:
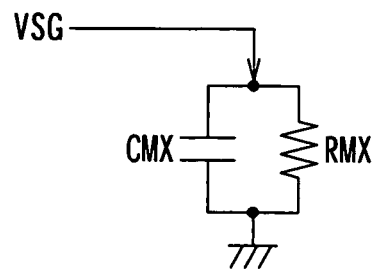
FIG. 4 is an equivalent circuit schematic illustrating a detection object in accordance with the first embodiment.

An equivalent circuit of a detection object such as a human body, or water, which is detected by the capacitance type sensor 61 configured in the above-described manner, is expressed as a parallel circuit of resistance (real term: conductance) RMX and capacitance (imaginary term: susceptance) CMX as illustrated in FIG. 4. Accordingly, the capacitance type sensor 61 actually detects impedance Z having a real term R and an imaginary term C rather than detecting capacitance.

Figure 5:
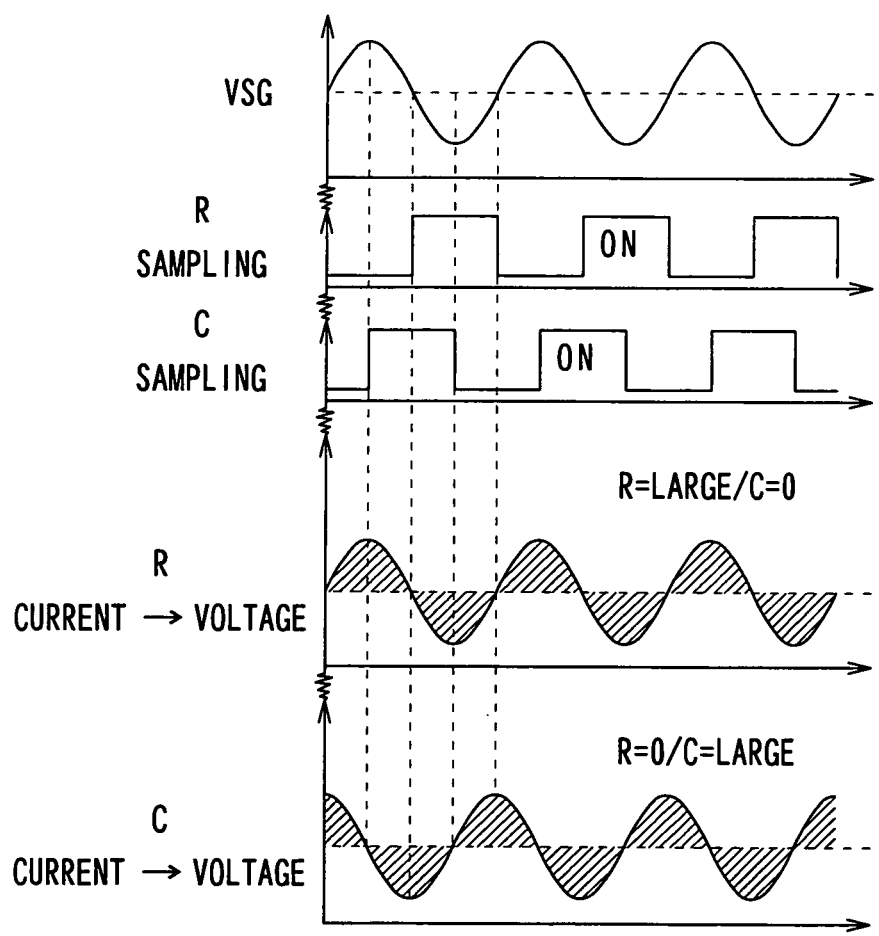
FIG. 5 is a diagram illustrating signal wave forms at a time of measurement by a capacitance type sensor in accordance with the first embodiment.

When a sine-wave voltage of VSG, which is illustrated in a first diagram of FIG. 5, is applied to this detection object from the oscillating circuit of the control part 7, an electric potential difference in accordance with impedance of the detection object (person or object on the seating portion 3) is generated in the current sensing resistor in the control part 7. If the real term R alone exists in the impedance of the detection object, a phase-lead element relative to the signal source VSG is not included in the electric potential difference generated in the current sensing resistor. When the electric potential difference generated in the current sensing resistor is extracted with real term R sampling timing illustrated in a second diagram of FIG. 5 having the same phase as the signal source VSG, an output in accordance with the magnitude of the real term R alone is obtained as illustrated in a fourth diagram of FIG. 5.

If the imaginary term C alone exists in the impedance of the detection object, a phase-lead element relative to the signal source VSG is included in the electric potential difference generated in the current sensing resistor. When the electric potential difference generated in the current sensing resistor is extracted with imaginary term C sampling timing illustrated in a third diagram of FIG. 5, which is advanced by 90 degrees relative to the signal source VSG, an output only in accordance with the magnitude of the imaginary term C is obtained as illustrated in a fifth diagram of FIG. 5. Because an actual detection object is composed of the real term R and the imaginary term C, it is measured as the impedance Z having the above-described phase.

The determination circuit measures the impedance Z, and carries out the detection of the occupant (i.e., determination whether no one is seated, the CRS is attached, or an adult is seated on the vehicle seat 1) in accordance with the measured impedance Z. Thus, by converting an electric current flowing through the current sensing resistor into a voltage, according to the above-described supply signal from the sinusoidal wave VSG, the capacitance (more specifically, impedance Z) is measured.

As described above, the determination circuit of the control part 7 measures the impedance Z of the detection object from the capacitance type sensor 61, and determines whether there is no detection object (i.e., the vehicle seat 1 is vacant), the CRS is attached or an adult is seated based on the impedance Z.

Figures 6, 7:
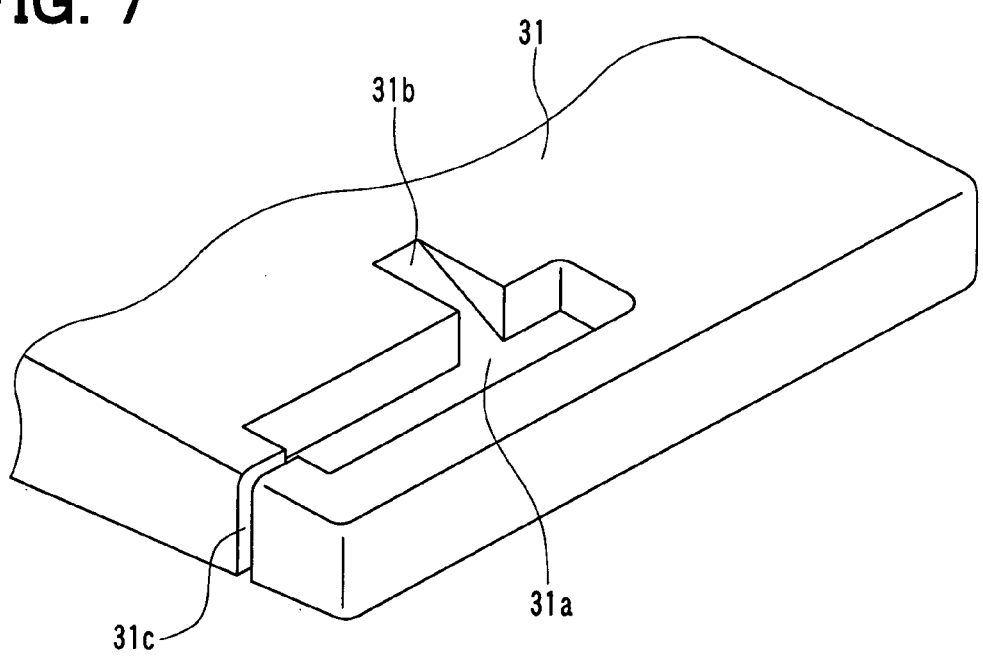
FIG. 6 is a table illustrating determination control by an occupant detection ECU in accordance with the first embodiment.
FIG. 7 is a perspective view illustrating a rear end part of a seat cushion in accordance with the first embodiment.

In this determination of capacitance, as indicated in a column A of a table in FIG. 6, the control part 7 makes "ON" determination where it is determined that an adult is seated, "OFF" determination where it is determined that the CRS is attached, or "VACANT" determination where it is determined that the vehicle seat 1 is vacant.

As shown in load detection determination indicated in a column B of the table in FIG. 6, the determination circuit makes "ON" determination if the seating sensor switch of the load detection sensor 62 is in an ON state, or "OFF" determination if the seating sensor switch is in an OFF state.

Based on the capacitance determination and the load detection determination, which are described above, the control part 7 makes final determination in the following manner, and then the airbag ECU controls the lighting-up of a lamp, for example, based on this determination.

That is, if the capacitance determination in the column A of FIG. 6 is "ON" where an adult is seated, and the load detection determination in the column B of FIG. 6 is "ON" or "OFF", the control part 7 makes "ON" determination as indicated in a column C of the table in FIG. 6, so that the airbag ECU turns on the airbag ON lamp as indicated in a column D of the table in FIG. 6.

If the capacitance determination in the column A of FIG. 6 is "OFF" where the CRS is attached, and the load detection determination in the column B of FIG. 6 is "ON" or "OFF", the control part 7 makes "OFF" determination as indicated in the column C of FIG. 6, so that the airbag ECU turns on the airbag OFF lamp as indicated in the column D of FIG. 6.

If the capacitance determination in the column A of FIG. 6 is "VACANT", and the load detection determination in the column B of FIG. 6 is "ON", the control part 7 makes "OFF" determination as indicated in the column C of FIG. 6, so that the airbag ECU turns on the airbag OFF lamp as indicated in the column D of FIG. 6. If the capacitance determination in the column A of FIG. 6 is "VACANT", and the load detection determination in the column B of FIG. 6 is "OFF", the control part 7 makes "VACANT" determination as indicated in the column C of FIG. 6, so that the airbag ECU turns off both the airbag ON lamp and the airbag OFF lamp as indicated in the column D of FIG. 6.

If the capacitance is rather small provided that the CRS is attached, i.e., when a child is seated, the vehicle seat 1 is erroneously determined to be "VACANT" based on the output of the capacitance type sensor 61. Even in such a case, since a load of the attached CRS is detected by the load detection sensor 62, and thereby "ON" determination is made, the control part 7 eventually determines that the CRS is attached ("OFF" determination), so that the airbag ECU turns on the airbag OFF lamp.

While the airbag ON lamp is turned on, the airbag ECU controls the airbag to be inflated if the vehicle collides. While the airbag OFF lamp is turned on, the airbag is not inflated even if the vehicle collides. The airbag is not inflated, either, while both the lamps (i.e., airbag ON lamp and airbag OFF lamp) are turned off.

The housing of the control part main body 71 is formed in a shape of a generally rectangular parallelepiped. However, as illustrated in FIG. 3, corner portions 71a, 71b of the control part 7 on the seating surface side are rounded. The corner portion 71a is on a near side of the sensor mat portion 6 and located in front and on an obliquely upper side when the control part 7 is attached to the seating portion 3, which is described in greater detail hereinafter. Because the corner portions 71a, 71b are rounded, a distance from the occupant who is seated on the seating portion 3 to the control part main body 71 is made longer compared to when the corner portions 71a, 71b are sharp. As a result, the possibility of contact of the control part 7 with the buttocks of the occupant is reduced when he or she is seated, so that occupant comfort improves. A longitudinal direction of the housing of the control part main body 71 is perpendicular to a direction in which the extended portions 61b, 62b project. When such an occupant detection device including the sensor mat portion 6 and the control part 7 is attached to the vehicle seat 1, the control part 7 may be attached to a portion of the seating portion 3 on the lower side of the backrest portion 4, and the electrode portion 61a may be attached to a portion of the seating portion 3 other than the portion of the seating portion 3 on the lower side of the backrest portion 4. In such a case, since a projecting direction of the extended portion 61b, through which the electrode portion 61a and the control part 7 are connected, is perpendicular to the longitudinal direction of the control part 7, the longitudinal direction of the control part 7 is easily arranged parallel to the right-left direction of the vehicle seat 1. Accordingly, the control part 7 is accommodated on the lower side of the backrest portion 4, and a size of the control part 7 is sufficiently ensured.

The sensor connector 72 projects from a lateral surface of the control s part main body 71 on the sensor mat portion 6 side toward the sensor mat portion 6, perpendicular to the lateral surface. A formation position of the sensor connector 72 on the above-described lateral surface is positioned disproportionately, as illustrated in FIG. 3, on one side of the lateral surface (i.e., on the lower side when the control part 7 is attached to the seating portion 3) in a direction perpendicular to the sensor mat portion 6. The end portions of the extended portions 61b, 62b are connected to the sensor connector 72, so that electric connection between the capacitance type sensor 61 and the load detection sensor 62, and the control part main body 71 is made.

The sub harness connector 73 is formed to project perpendicularly from a lateral surface of the control part main body 71 that is perpendicular to the above lateral surface of the control part main body 71 on which the sensor connector 72 is attached. The sub harness is connected to the sub harness connector 73 and the sub harness is connected to a wire harness of the vehicle. Accordingly, connection between the control part 7 and the vehicle-side device is realized.

With reference to FIGS. 7 to 10, structure of the seat cushion 31, on which the sensor mat portion 6 and the control part 7 are attached, will be described below. As illustrated in FIG. 7, a first recessed portion 31a, a second recessed portion 31b, and a notched portion 31c are formed in the seat cushion 31.

The first recessed portion 31a is a recess for accommodating the control part 7, and has an almost same shape as an outer shape of the control part 7. The second recessed portion 31b is a recess for accommodating the extended portion 61b and the extended portion 62b.

Figure 9:
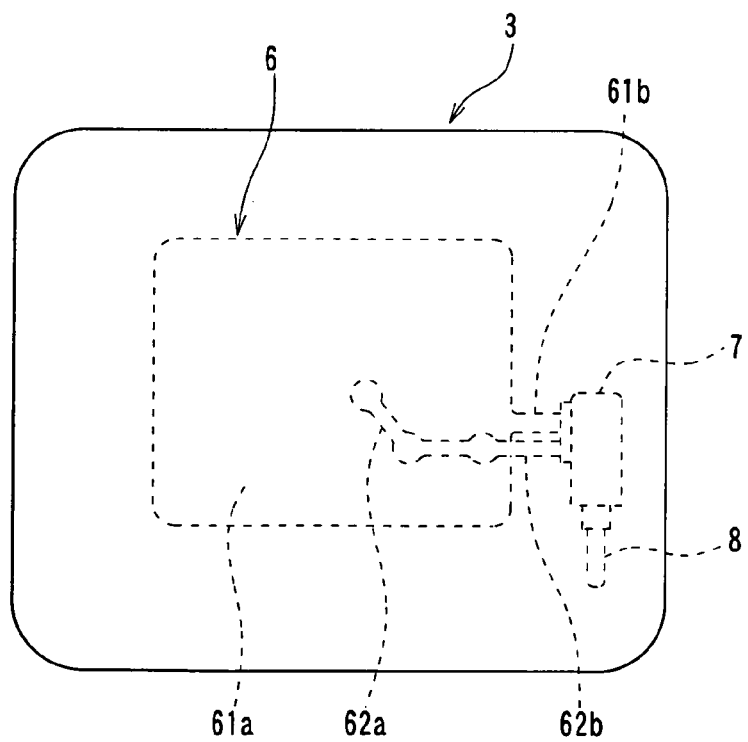
FIG. 9 is a plan view illustrating the seating portion viewed from its upper side in accordance with the first embodiment.

Attachment of the sensor mat portion 6 and the control part 7 to the seating portion 3 will be described in detail. In FIG. 9, the sensor mat portion 6, the control part 7, and a sub harness 8 are illustrated transparently with a dashed line.

Figure 8:
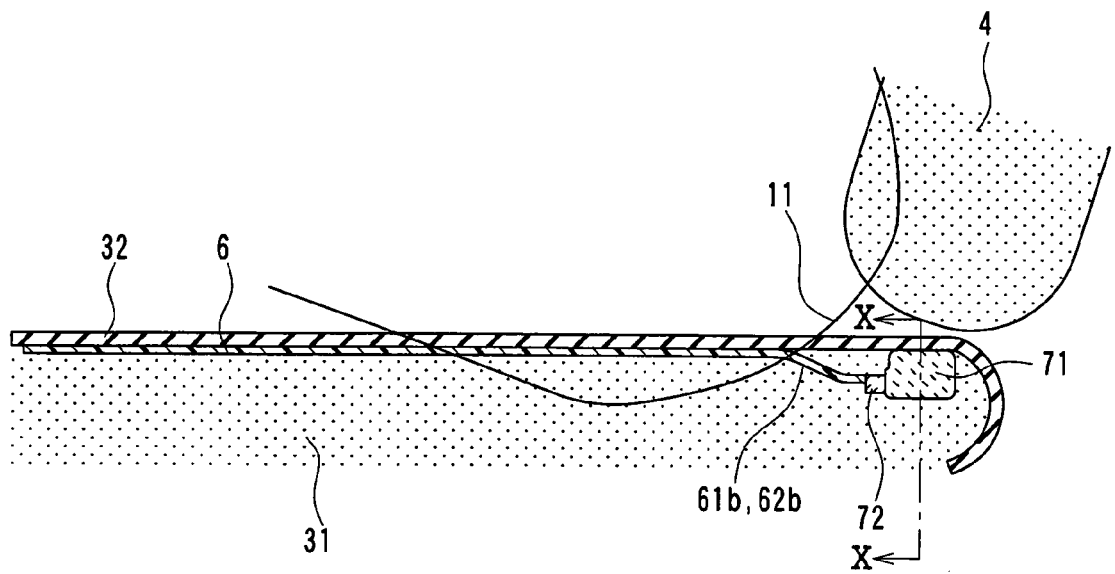
FIG. 8 is an enlarged view illustrating a rear part of a seating portion on the same cross section as FIG. 1 in accordance with the first embodiment.

As illustrated in FIG. 8, the sensor mat portion 6 is positioned between an upper end surface of the seat cushion 31 and the seat cover 32.

As illustrated in FIG. 9, the film, which is made up of the electrode portion 61a, the switch portion 62a, and the urethane pad 63, is located at a central region of the seating portion 3 as viewed from the upper side. At the central region, the film is bonded and fixed to the seat cushion 31 by adhesive bond or the like.

The extended portions 61b, 62b extend from an end portion of the second recessed portion 31b on the capacitance type sensor 61 side toward the sensor connector 72 of the control part 7 in a direction of an obliquely lower side generally along a bottom surface of the second recessed portion 31b. The extended portions 61b, 62b are not bonded to the seat cushion 31.

The extended portions 61b, 62b do not continue linear from the electrode portion 61a to the sensor connector 72, but they are curved in an S-shaped manner. In order to naturally make this curved shape, the first recessed portion 31a is formed in such a position that a linear distance from an end portion of the electrode portion 61a, from which the extended portions 61b, 62b project, to the sensor connector 72 is shorter than lengths of the extended portions 61b, 62b, and the film, which is made up of the electrode portion 61a, the switch portion 62a, and the urethane pad 63, is fixed to the seat cushion 31.

When the occupant is seated on the vehicle seat 1, the seat cushion 31 changes it shape so that the distance from the electrode portion 61a to the control part 7 increases. Even in such a case, because the extended portions 61b, 62b have allowances by curving the extended portions 61b, 62b beforehand in the above-described manner, generation of an excessive tensile stress in the extended portions 61b, 62b is prevented.

The control part 7 is fitted into the first recessed portion 31a. As illustrated in FIG. 8, a position of the first recessed portion 31a corresponds to a position of the seat cushion 31 on a lower side of the backrest portion 4. When the occupant is seated on the vehicle seat 1, an outer shape of the buttocks and thighs of the occupant may be indicated by a line 11. By disposing the control part 7 on the lower side of the backrest portion 4, which is away from a seating position of the occupant, the possibility of contact of the control part 7 with the buttocks of the occupant is reduced, so that occupant comfort improves.

The first recessed portion 31a is formed on the seat cushion 31 in advance, and the control part 7 is disposed in the first recessed portion 31a. Consequently, the need for fixation of the control part 7 to the seat cushion 31 via a screw or the like is reduced, so that the attachment of the control part 7 is facilitated. Furthermore, the control part 7 is accommodated in the recessed portion 31a, and thereby the control part 7 is surrounded in the seat cushion 31 to be held by resilient force of the seat cushion 31. As a result, vibration of the vehicle is absorbed by the seat cushion 31, so that it does not easily reach the control part 7. Eventually, vibration-resistance strength required for the control part 7 decreases. In addition, when the control part 7 is accommodated in the seat cushion 31, the amount of change of shape of the seat cushion 31 decreases. Accordingly, a possibility that the occupant feels the seat cushion 31 to be irregular when he or she is seated on the seating portion 3, is reduced.

The control part main body 71 is disposed such that its longitudinal direction is parallel to the right-left direction of the vehicle seat 1 (i.e., direction perpendicular to a plane of a sheet on which FIG. 8 is illustrated). More specifically, the control part main body 71 is arranged in such a direction that it is flat in the lower and upper directions and longer in a direction of vehicle width. By arranging the control part main body 71 in the above-described direction, the control part 7 is easily accommodated in the lower side of the backrest portion 4 with volume of the control part 7 ensured. Therefore, the possibility of contact of the control part 7 with the buttocks of the occupant is further reduced, so that the occupant comfort improves.

The sensor connector 72 is formed on the lower side of the center of the lateral surface of the control part main body 71 in the lower and upper directions. As a result, the sensor connector 72, which projects from the control part main body 71 to the front, is located farther from the occupant who is seated on the seating portion 3. Thus, the possibility of contact of the control part 7 with the buttocks of the occupant is reduced, so that occupant comfort improves.

The control part 7 is disposed on the upper side of the center of the seating portion 3, which is on the lower side of the backrest portion 4, in the lower and upper directions. More specifically, an upper end surface of the control part main body 71 and a surface of the electrode portion 61a of the sensor mat portion 6 are arranged generally in the same plane. By virtue of such an arrangement, a distance from the control part 7 to the electrode portion 61a is made shorter compared to a placement of the control part 7 on an even lower side of the seating portion 3. Accordingly, the extended portions 61b, 62b are made short. Consequently, the possibility that the extended portions 61b, 62b are influenced by noise is reduced, so that whether the occupant is seated or not is accurately determined. The projecting portion from the rectangular capacitance type sensor 61 is made shorter. For this reason, when two or more capacitance type sensors 61 are cut off from a single large sheet, a yield ratio (i.e., number of capacitance type sensors 61 produced per unit area of the sheet) improves. Furthermore, the need to provide a shielding wire for noise control for the extended portion 61b and the extended portion 62b is reduced. In addition, because the extended portions 61b, 62b are short, a possibility that the extended portions 61b, 62b are entangled or their handling becomes complicated is reduced.

Figure 10:
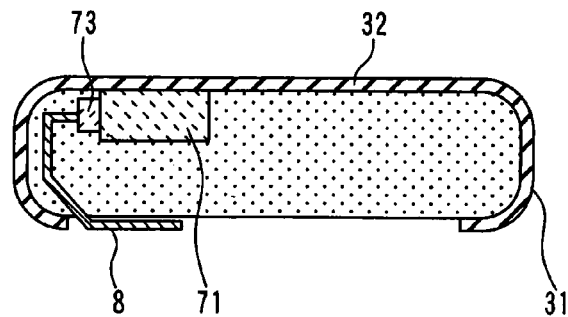
FIG. 10 is a cross-sectional view taken along a line X-X in FIG. 8.

As illustrated in FIG. 10, the sub harness connector 73 projects from the control part main body 71 to a side that is closer to an end portion of the seating portion 3 in the right-left direction. One end of the sub harness 8 is connected to this sub harness connector 73. The sub harness 8 reaches a bottom surface of the seat cushion 31 through the notched portion 31c illustrated in FIG. 7 so as to be exposed to the outside of the seating portion 3 from this bottom surface. The sub harness 8 is connected to the wire harness of the vehicle via a connector, and connected to the vehicle-side device (i.e., airbag ECU, and warning device for warning the occupant that a seat belt is not used) through this wire harness of the vehicle.

Since the sub harness connector 73 projects in the right-left direction in the above-described manner, most of the sub harness 8 is more easily accommodated in the seat cushion 31 compared to when the sub harness connector 73 projects to the rear having little space. In consequence, at the time of production of the vehicle seat 1, the sub harness connector 73 and the sub harness 8 are connected, and most of the sub harness connector 73 is covered with the seat cover 32. Therefore, a possibility of direct contact of a person with the sub harness connector 73 when the vehicle seat 1 is installed in the vehicle, or when the vehicle is used, for example, is reduced. Moreover, the sub harness 8 is covered without providing a cover other than the seat cover 32.

As described above, because the control part 7 is disposed in the seat cushion 31 on the lower side of the backrest portion 4, the extended portion 61b, which is a route to make electric connection between the capacitance type sensor 61 disposed in the seating portion 3, and the control part 7, does not need to pass by the front end of the seating portion 3. Not only the electrode portion 61a and the switch portion 62a but also the extended portions 61b, 62b are arranged at a seating portion of the occupant. Accordingly, the length of the extended portion 61b is made shorter, and an adverse effect produced by the noise that is not related to whether or not the occupant is seated, is reduced. Hence, with the control part 7 arranged in such a position that the occupant does not have an uncomfortable feeling about the seating surface on which he or she is seated at normal time, occupant detecting performance improves.

The noise that is not related to whether or not the occupant is seated may be noise due to the presence of a human body part below a knee, or noise due to the other metal objects. For instance, the route to make electric connection between the capacitance type sensor 61 disposed in the seating portion 3, and the control part 7 may pass by the front end portion of the seating portion 3. Such a case is undesirable, since, provided that a person puts his or her body part below the knee at the front of the vehicle seat 1 for him or her to get into the vehicle, when the person moves his or her leg with him or her wearing boots with metallic ornaments, capacitance between the body part below the knee and the extended portion 61b varies. Furthermore, an object such as an aluminum sheet may hang down on the extended portion 61b from the CRS, on which a child is seated. Such a case is undesirable because, when the extended portion 61b and the aluminum sheet come close to or away from each other because of the acceleration of travel of the vehicle, the blow of air from an air conditioner in the vehicle, or the like, fluctuation of the capacitance is generated.

(Second Embodiment)

Figure 11:
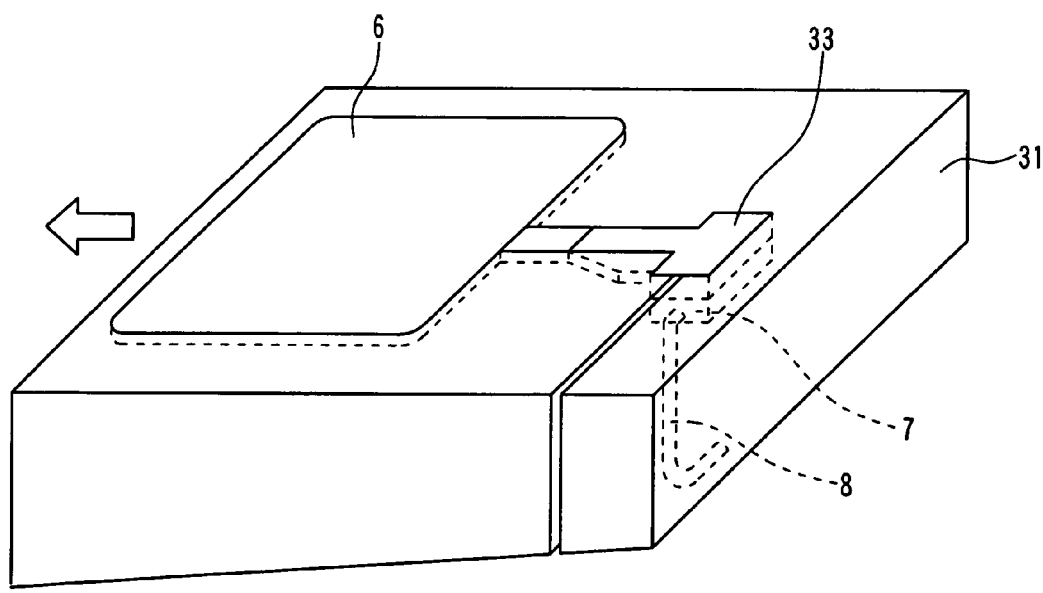
FIG. 11 is a perspective view illustrating a seating portion and a member attached to the seating portion in accordance with a second embodiment of the invention.
Figure 12:
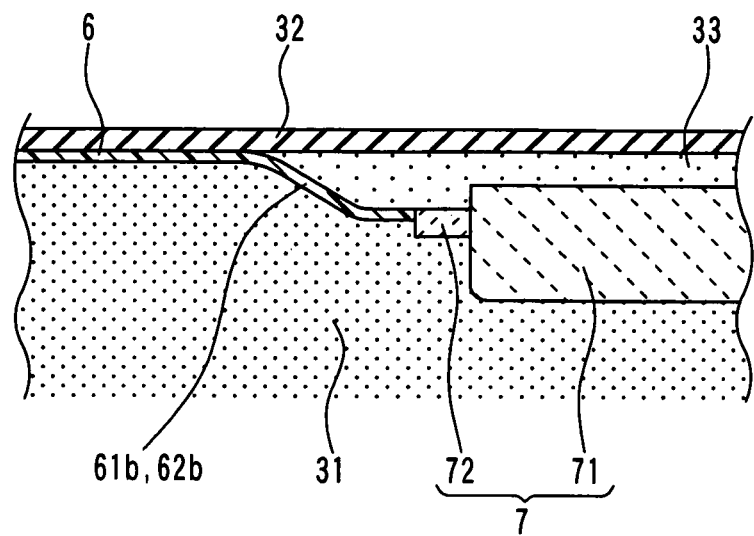
FIG. 12 is an enlarged view illustrating a control part and its vicinity on the same cross section as FIG. 1 in accordance with the second embodiment.
Figure 13:
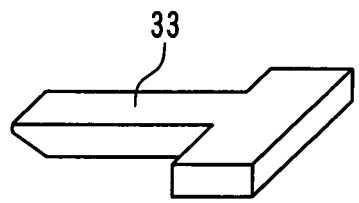
FIG. 13 is a perspective view illustrating a spacer cushion in accordance with the second embodiment.

With reference to FIGS. 11 to 13, a second embodiment of the invention will be described below with a focus on its different features from the first embodiment. FIG. 11 is a perspective view illustrating a seat cushion 31 and a member that is attached to the seat cushion 31 according to the second embodiment. A direction of an arrow in FIG. 11 indicates the front.

The present embodiment is different from the first embodiment in the following respects: (1) arrangement of a control part 7 in the seat cushion 31, (2) a seating portion 3 includes a spacer cushion 33, and (3) placement of a sensor connector 72 relative to a control part main body 71 of the control part 7.

In the present embodiment, an upper end surface of the control part main body 7 is, unlike the first embodiment, not in the same plane as an electrode portion 61a of a sensor mat portion 6 and located at a lower position than the sensor mat portion 6. For this reason, a first recessed portion 31a (see FIG. 7) of the seat cushion 31 is deeper than the first embodiment.

The spacer cushion 33 as a buffer material is attached on upper end surfaces of extended portions 61b, 62b and the upper end surface of the control part main body 7 independently from the seat cushion 31. The spacer cushion 33 is formed and attached such that an upper end surface of the spacer cushion 33 is located generally in the same plane as the electrode portion 61a of the sensor mat portion 6.

By placing the spacer cushion 33 on the upper end surface of the control part main body 7 as described above, stress that is applied to a seating surface of the seating portion 3 is dispersed because the spacer cushion 33 is softer than the control part 7. Accordingly, even if buttocks of an occupant is positioned on the control part 7 for some particular reasons, the occupant does not have a feeling of a foreign body.

The spacer cushion 33 is formed as a different member from the seat cushion 31. Therefore, in the seat cushion 31, the first recessed portion 31a and a second recessed portion 31b open on the upper side. As a result, the first recessed portion 31a and the second recessed portion 31b are easily formed compared to forming the spacer cushion 33 integrally with the seat cushion 31.

Since the upper end surfaces of the electrode portion 61a and the spacer cushion 33 are generally in the same plane, a level difference is reduced between a portion of the seating surface of the seating portion 3 under which the control part 7 exists, and the other portion under which the control part 7 does not exist. As a consequence, a possibility that the occupant feels the seat cushion 31 to be irregular when he or she is seated on the seating portion 3, is reduced.

The sensor connector 72 is formed on a lateral surface of the control part main body 71 on an upper side of the center of this lateral surface in lower and upper directions. Thus, a distance from the sensor connector 72 to the electrode portion 61a becomes short, so that the extended portions 61b, 62b are made even shorter.

(Third Embodiment)

A third embodiment of the invention will be described below with reference to FIGS. 14 to 20. A seat with an occupant detecting function according to the third embodiment is different from the first embodiment mainly in respect of arrangement of a control part 7 in a seating portion 3 and a supporting structure for the control part 7. Placement and structure of a sensor mat portion 6, and operations of the sensor mat portion 6 and the control part 7 are similar to the first embodiment.

Figure 14:
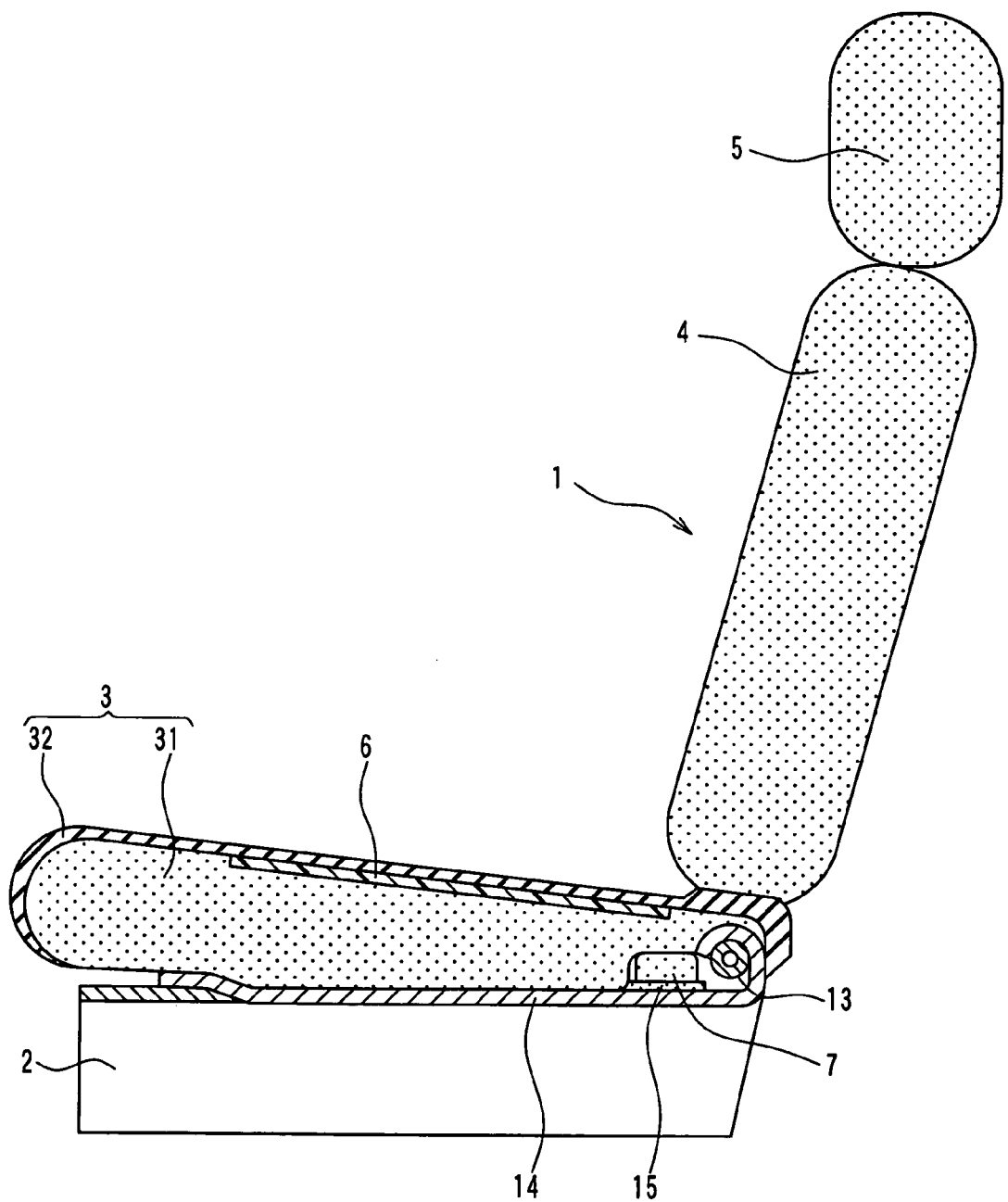
FIG. 14 is a cross-sectional view illustrating a vehicle seat in accordance with a third embodiment of the invention.

The arrangement of the control part 7 will be described. As illustrated in FIG. 14, the control part 7 of the present embodiment is located on a lower side of a backrest portion 4 (i.e., in such a position that the control part 7 is hidden behind the backrest portion 4 when viewed from an immediate upper side of the backrest portion 4). The present embodiment is similar to s the first embodiment in this respect.

Figure 15:
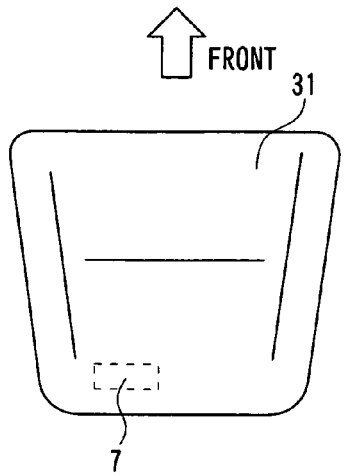
FIG. 15 is a diagram illustrating a position of a control part in a seat cushion in accordance with the third embodiment.

As illustrated in FIG. 15, the control part 7 is arranged at a position that is shifted from the center of a seat cushion 31 of the seating portion 3 in the right-left direction (more specifically, at a position shifted to the left side). The present embodiment is similar to the first embodiment in this respect, too. By virtue of such an arrangement, a possibility that an occupant has a feeling of a foreign body because of the control part 7 is reduced.

As illustrated in FIG. 14, however, the present embodiment is different from the first embodiment in that the control part 7 is not disposed at an upper end portion of the seating portion 3 but at a lower end portion. Because of such an arrangement of the control part 7, a lower part of an rear end of the seat cushion 31 is notched as shown in FIG. 14, and the control part 7 is placed in the notched part.

The structure for supporting the control part 7 will be described. Since the control part 7 is, as described above, disposed in the notched part of the lower part of the rear end of the seat cushion 31, the control part 7 is located on a lower side of the seat cushion 31. Accordingly, unlike the first embodiment, the control part 7 is not held by the seat cushion 31 from its lower side.

Instead, the control part 7 is supported by a line of a spring 14a (corresponding to an example of a "supporting member") of springs attached to a seat frame 2 made of metal, from the lower side of the seating portion 3. These springs are resilient members such as steel springs, and fixed to the seat frame 2 and a rod 13 made of metal. A felt 15 is disposed between the spring 14a and the control parts 7. By the intervention of the felt 15, even if the control part 7 is displaced in small motions in lower and upper directions by vibration of the vehicle for example, an abnormal noise as a result of direct contact between an outer shell (e.g., resin or metal) of the control part 7 and the spring 14a is not made. Therefore, the felt 15 functions as a noise reducing member.

Figure 16:
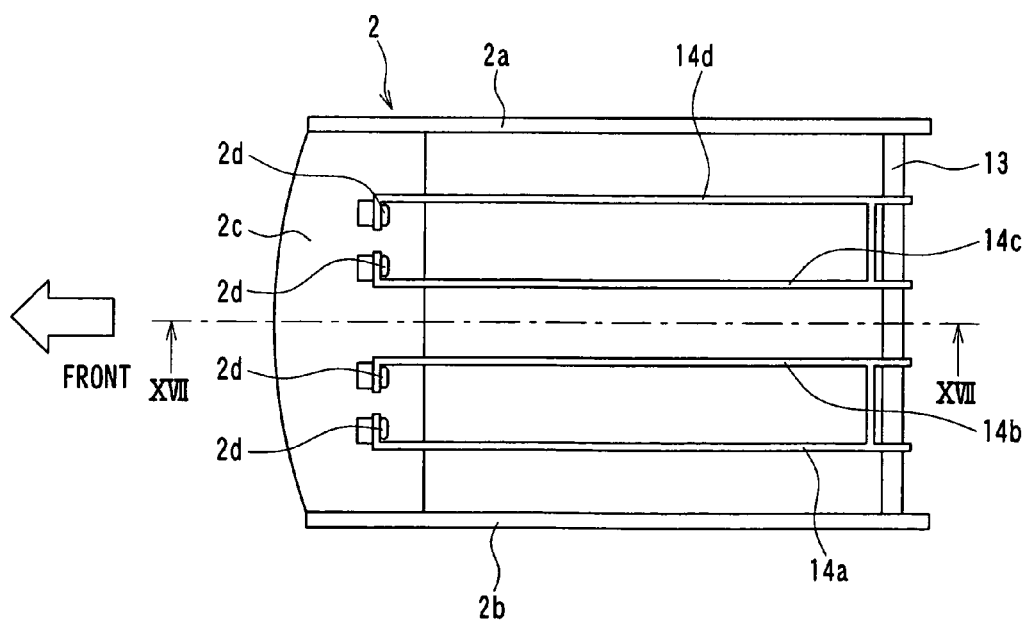
FIG. 16 is a diagram illustrating a configuration of a sheet frame, a rod, and springs in accordance with the third embodiment.

FIG. 16 is a diagram illustrating the seat frame 2, the rod 13, and the springs 14a to 14d when they are viewed from their upper side.

Figure 17:
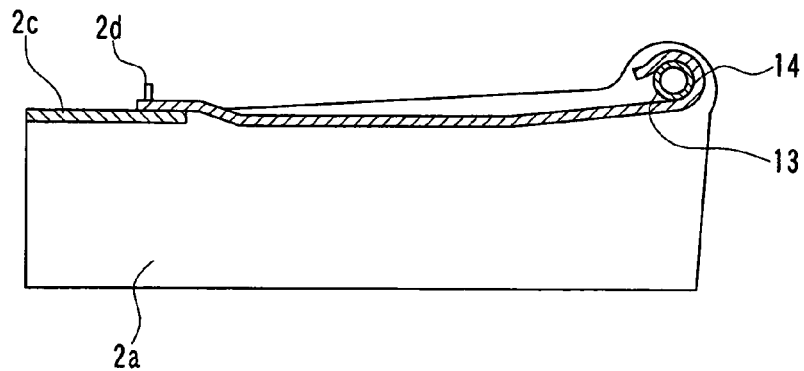
FIG. 17 is a cross-sectional view taken along a line XVII-XVII in FIG. 16.

As illustrated in FIGS. 16 and 17, the seat frame 2 includes two side surface plates 2a, 2b that are perpendicular to the right-left direction, and a top plate 2c that is horizontally fixed to upper ends of front portions of the side surface plates 2a, 2b. The seat frame 2 is formed as a whole in a horseshoe shape when viewed from its upper side. The side surface plates 2a, 2b are in contact with a bottom surface of each lateral end portion of the seat cushion 31 so as to support the seat cushion 31. The top plate 2c is in contact with a bottom surface of a front end portion of the seat cushion 31 so as to support the seat cushion 31. The rod 13 is a metal member having a pipe shape with its both ends fixed to upper sides of rear end parts of the side surface plates 2a, 2b.

One end of each of the two or more (specifically, four) springs 14a to 14d is fixed to a claw portion 2d that is formed on an upper surface of the top plate 2c of the seat frame 2, and the other end of each of the springs 14a to 14d is wound and fixed on the rod 13. By virtue of such an structure, the springs 14a to 14d are made tense in the front-rear direction within an area surrounded by the seat frame 2 and the rod 13. Each adjacent two of the springs 14a to 14d is grouped into a pair, and paired springs (springs 14a, 14b and springs 14c, 14d) are joined together at their rod 13 side end portions.

The springs 14a to 14d, which are made tense from the claw portion 2d to the rod 13 in the above-described manner, are in contact with a central part of a bottom surface of the seat cushion 31 so as to resiliently support the seat cushion 31.

Figure 18:
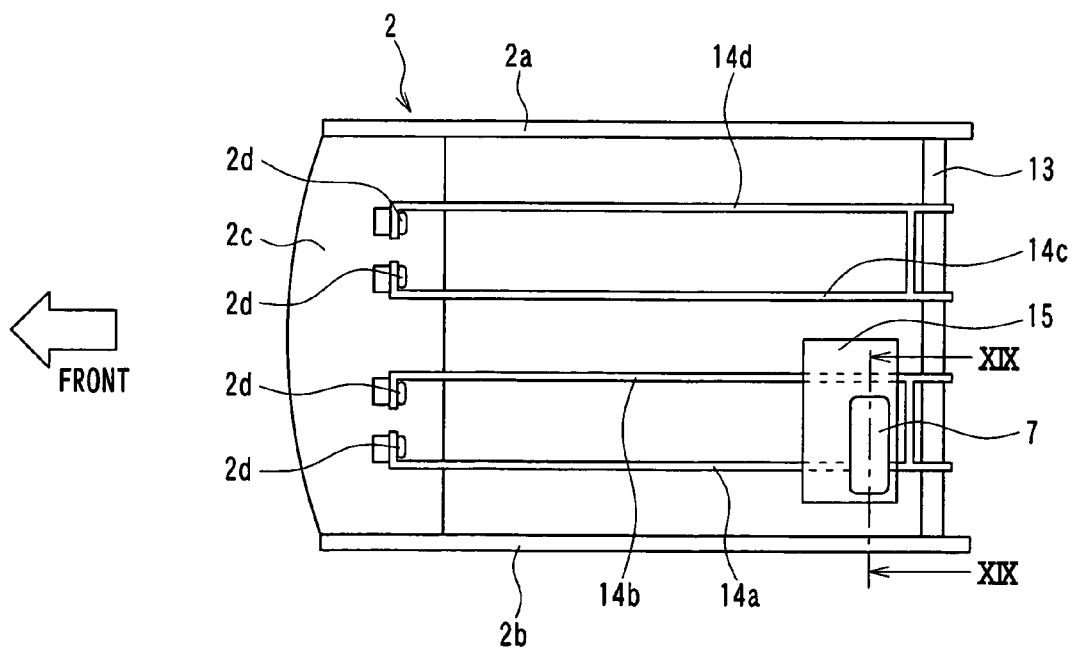
FIG. 18 is a diagram illustrating arrangement of a felt and the control part on the spring in accordance with the third embodiment.
Figure 19:
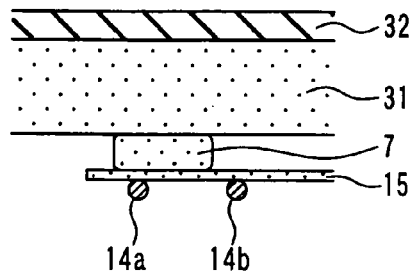
FIG. 19 is a cross-sectional view illustrating a seating portion taken along a line XIX-XIX in FIG. 18.

Arrangement of the control part 7 and the felt 15 on the seat frame 2, the rod 13, and the springs 14a, 14b is illustrated in FIGS. 18 and 19. FIG. 18 is a diagram illustrating the seat frame 2, the control part 7, the rod 13, the springs 14a, 14b, and the felt 15 when they are viewed from their upper side.

The felt 15 is a cloth having thickness of about 5 mm, and arranged to cover portions of the paired springs 14a, 14b that are close to the rod 13. The felt 15 is only mounted on the springs 14a, 14b, and not fixed to the springs 14a, 14b.

The control part 7 is disposed in contact with an upper surface of the felt 15 so that the control part 7 is located between the seat cushion 31 and the felt 15 in the lower and upper directions. Only the spring 14a of the two springs 14a, 14b, which are covered with the felt 15 exists on an immediate lower side of the control part 7.

Accordingly, in regard to a relationship between the control part 7 and the spring 14a, the control part 7 is supported by a single line of the spring 14a. A portion of the spring 14a that supports the control part 7 extends perpendicular to a longitudinal direction of the control part 7.

In a vehicle seat 1 having the above-described structures, a situation in which the occupant reclines the backrest portion 4 to the rear, and presses his or her knee on base parts of the backrest portion 4 and the seating portion 3 will be explained below. Such a situation may arise very often, for instance, when an occupant on a passenger seat of the vehicle turns around and stretches his or her hand toward a rear seat to reach out for baggage on the rear seat.

Figure 20:
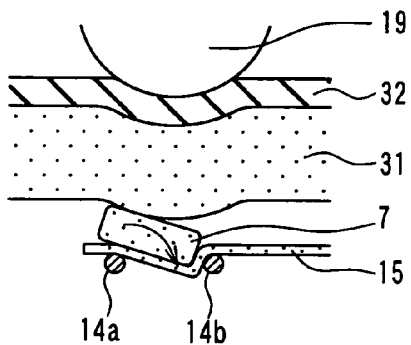
FIG. 20 is a cross-sectional view illustrating the seating portion taken along the line XIX-XIX in FIG. 18.

A state of the seating portion 3 in the above-described situation is illustrated in FIG. 20 in the same style as FIG. 19. In this situation, pressure is applied to a seat cover 32 and the seat cushion 31 by a knee 19 of the occupant, and then the pressure is transmitted to the control part 7. If a position of the knee 19 is shifted from an immediate upper side of the spring 14a, the control part 7 which has received this pressure rotates with the spring 14a as a rotation center. In other words, the control part 7 rotates to relieve the pressure by the knee 19 of the occupant. As a result, reaction force applied by the control part 7 to the knee 19 is reduced compared to a case in which the control part 7 does not rotate, so that a feeling of a foreign body due to the control part 7 is not easily transmitted to the knee 19.

Even though the control part 7 rotates, a possibility that the control part 7 falls is reduced because the felt 15 is located on a lower side of the control part 7. Seen in that light, it may follow that the felt 15 also supports the control part 7 from its lower side. Since the felt 15 is not fixed to the springs 14a, 14b, the felt 15 is bent in accordance with the rotation of the control part 7, so that the felt 15 does not prevent the rotation of the control part 7. Accordingly, the felt 15 supports the control part 7 softly by bearing power which is weaker than the spring 14a.

In this manner, the spring 14a supports the control part 7 most firmly by the strongest bearing power on its line. Consequently, when the seat cushion 31, which is above the control part 7, is pressed from its upper side by the knee 19 of the occupant, the control part 7 rotates with its certain portion that is held by the spring 14a serving as a rotation center. By this rotation of the control part 7, a possibility that the occupant has a feeling of a foreign body due to the reaction force by the control part 7 is reduced.

Furthermore, the conventional use of the spring 14a for supporting the seating portion 3 is diverted so that the spring 14a is used as a member for supporting the control part 7 on a line. Accordingly, the structure of the vehicle seat 1 is simplified. The spring 14a extends perpendicular to the longitudinal direction of the control part 7. Therefore, the control part 7 more easily rotates compared to a case where the spring 14a extends parallel to the longitudinal direction of the control part 7.

In addition, when the seating portion 3 returns from a state in which the seating portion 3 is pressed by the knee 19 of the occupant or the like to a state in which the seating portion 3 is not pressed, the position of the control part 7 is returned to a state illustrated in FIG. 19 by restoring force of a portion of the seat cushion 31 that is in contact with the upper surface of the control part 7.

The embodiments of the invention have been described above. The scope of the invention is not limited to the above-described embodiments alone, and the scope of the invention encompasses various embodiments that can fulfill a function of each feature of the invention.

Modifications of the above embodiments will be described below.

In the above embodiments, the control part 7 is disposed on the upper surface side of the seat cushion 31. Alternatively, the control part 7 may be disposed on a rear surface of the seat cushion 31.

Provided that the seating portion 3 tapers off toward the rear as in the above embodiments, as long as the attachment position of the control part 7 is on the lower side of the backrest portion 4, the length of the extended portion 61b is further reduced than previously existing technology even if the control part 7 is not close to the seating surface. More specifically, because the control part 7 is located in a thinner portion of the seating portion 3 than its front (i.e., lower side of the backrest portion 4), the length of the extended portion 61b is made short regardless of the position of the control part 7 in the lower and upper directions, compared to the arrangement of the control part 7 on the lower side of the front portion of the seating portion 3 as described in JP-A-11-11256.

The control part 7 may have no connector 72, and accordingly the extended portions 61b, 62b may be connected directly to the control part main body 71.

In the above embodiments, the vehicle seat 1 is the passenger seat of the vehicle. The vehicle seat 1 is not limited to the passenger seat. More specifically, the vehicle seat 1 may be any seat that is mounted on a vehicle (e.g., passenger automobile, bus or train).

Whether the occupant is seated may be determined in the airbag ECU instead of the control part 7. In such a case, the control part 7 does not have the determination circuit, and sends measurement data of the impedance Z needed for the determination of existence of the occupant to the airbag ECU.

In the third embodiment, the placement of the control part 7 is not necessarily on the lower side of the backrest portion 4. The control part 7 may be placed in the other portion of the seating portion 3 (e.g., front end part or central part). In such a case, the control part 7 rotates not only by a pressure from the knee 19 of the occupant, but also by a pressure from the other body part of the occupant.

In the third embodiment, as long as the other mechanism, which is configured such that a contact sound between the spring 14a and the control part 7 does not cause major problems and that the control part 7 does not fall, is provided for the vehicle seat 1, the felt 15 is not necessarily required.

In order to produce to the maximum extent possible an effect of facilitating the rotation of the control part 7 compared to a case where the spring 14a extends parallel to the longitudinal direction of the control part 7, it is desirable that the spring 14a extend perpendicular to the longitudinal direction of the control part 7 as in the third embodiment. However, in order to produce in any way the effect of facilitating the rotation of the control part 7 compared to a case where the spring 14a extends parallel to the longitudinal direction of the control part 7, it is only necessary for the spring 14a to extend non-parallel to the longitudinal direction of the control part 7.

As regards a positional relationship between the spring 14a and the control part 7 in the right-left direction (i.e., direction perpendicular to the direction in which the spring 14a extends), the spring 14a may be located at a position that is shifted from the center of the control part 7 in the right-left direction as in the third embodiment, or the spring 14a may be located at the center of the control part 7 in the right-left direction.

In the above embodiments, another material (e.g., cardboard or vinyl buffer material) for preventing the control part 7 from falling may be used instead of the felt 15.

In the third embodiment, the spring 14 supports the control part 7 such that the control part 7 rotates with the spring 14 serving as a rotation center when the seating portion 3 is pressed by the knee 19 of the occupant or the like. The supporting member for supporting the control part 7 in such a mode is not limited to the spring 14, and a bar that does not have resilience may be employed as the supporting member.

Figure 21:
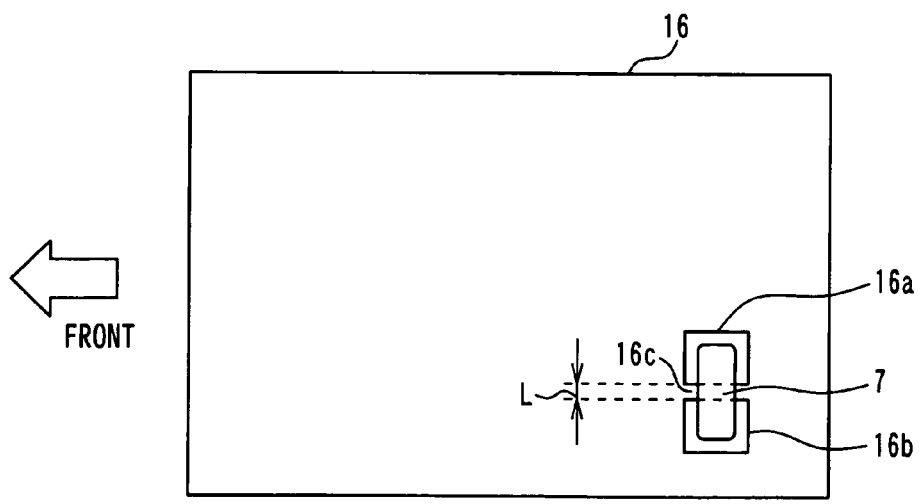
FIG. 21 is a diagram illustrating a modification of a structure for supporting the control part in accordance with the third embodiment.

For example, it is assumed that, as illustrated in FIG. 21, a metal supporting plate 16 is fixed to the upper end of the seat frame 2, and the seating portion 3 is supported by the supporting plate 16. In this case, slits 16a, 16b, which are arranged in the right-left direction, are formed at the end portion of the supporting plate 16 on the left side of the rear portion thereof, and a distance L between the two slits 16a, 16b is made equal to or smaller than a tenth of the length of the control part 7 in its longitudinal direction. The control part 7 is placed on a bridging portion 16c having a width L (corresponding to an example of the supporting member) between the slits 16a, 16b. Sizes of the slits 16a; 16b are adjusted in advance, such that in placing the control part 7, the other portion of the supporting plate 16 is not in contact with the control part 7. The felt 15 may be disposed between the control part 7 and the bridging portion 16c. In such a case as well, when the occupant reclines the backrest portion 4 to the rear, and presses his or her knee on base parts of the backrest portion 4 and the seating portion 3, the control part 7 that has received the pressure rotates with the bridging portion 16c as a rotation center. In other words, the control part 7 rotates to relieve the pressure by the knee of the occupant. As a result, reaction force applied by the control part 7 to the knee 19 is reduced compared to a case in which the control part 7 does not rotate, so that a feeling of a foreign body due to the control part 7 is not easily transmitted to the knee 19. In this case as well, the control part 7 is supported substantially by the bridging portion 16c having a much smaller width than the size of the control part 7 on a line.

The control part 7 does not need to be supported by a line. For instance, the control part 7 may be two-point supported from its lower side by two bars parallel to the lower and upper directions of the vehicle seat 1. In such a case, two end portions of the two bars support the control part 7. When the seating portion 3 is pressed from its upper side, the control part 7 rotates with a line connecting the two end portions as a rotation center. In this case, the two bars correspond to an example of the supporting member. The control part 7 rotates with the two end portions as a center.

Additionally, for instance, the control part 7 may be single-point supported from its lower side by a single bar parallel to the lower and upper directions of the vehicle seat 1. In such a case, an end portion of the single bar supports the control part 7, and when the seating portion 3 is pressed from its upper side, the control part 7 rotates with this end portion as a center. In this case, the single bar corresponds to an example of the supporting member.

Additional advantages and modifications will readily occur to those skilled in the art. The invention in its broader terms is therefore not limited to the specific details, representative apparatus, and illustrative examples shown and described.

What is claimed is:

1. A seat having an occupant detecting function and installed in a vehicle, the seat comprising:
a seating portion that is adapted to support buttocks and thighs of an occupant of the vehicle, wherein the seating portion includes a seat cushion therein;
a capacitance sensor that is attached to the seating portion;
a controller that is installed in the seating portion and configured to apply a voltage to the sensor and to detect a value of an electric current, which passes through the sensor because of the voltage; and
a supporting member that supports the controller from a lower side thereof in a vertical direction, such that the controller is rotatable about the supporting member when the seating portion is pressed by the occupant; wherein
the supporting member and the controller are not directly connected together.

2. The seat according to claim 1, wherein the supporting member has a linear shape and supports a bottom surface of the controller in the vertical direction.

3. The seat according to claim 2, wherein a part of the supporting member that supports the controller is directed nonparallel to a longitudinal direction of the controller.

4. The seat according to claim 1, wherein the supporting member is a spring that supports the seating portion.

5. The seat according to claim 1, wherein:
the controller is shifted from a central region of the seating portion in a width direction thereof; and
the width direction coincides with a right-left direction of the occupant when the occupant is seated on the seating portion.

6. The seat according to claim 1, further comprising a backrest portion that is adapted to support a back of the occupant, wherein the controller is located in the seat cushion of the seating portion below the backrest portion in the vertical direction.

7. The seat according to claim 6, wherein:
the sensor includes an electrode portion having an electrode and an extended portion that projects from the electrode portion and is thereby electrically connected between the electrode portion and the controller; and
a thickness of the seating portion in the vertical direction decreases from a front side toward a rear side of the seating portion, given that:
the front side is one side that a backrest surface of the backrest portion faces to, the backrest surface adapted to be in direct contact with the back of the occupant; and
the rear side is an opposite side of the front side.

8. The seat according to claim 6, wherein:
the controller is formed longer in a width direction thereof than in the other two directions that are perpendicular to the width direction; and
the width direction coincides with a right-left direction of the occupant when the occupant is seated on the seating portion.

9. The seat according to claim 6, wherein:
the controller includes a controller main body that is formed generally in a shape of a rectangular parallelepiped;
a corner portion of the main body on a front side of the main body as well as on an upper side of the main body in the vertical direction is chamfered; and
the front side is one side that a backrest surface of the backrest portion faces to, the backrest surface adapted to be in direct contact with the back of the occupant.

10. The seat according to claim 6, wherein:
the seat cushion is adapted to support the occupant by resilient force thereof; and
the seat cushion includes a recessed portion in which the controller is accommodated.

11. The seat according to claim 10, wherein:
the seating portion includes a resilient spacer cushion separately from the seat cushion;
the spacer cushion is disposed on an upper side of the controller in the vertical direction; and
an upper end surface of the seat cushion and an upper end surface of the spacer cushion in the vertical direction are generally in the same plane.

12. A seat having an occupant detecting function and installed in a vehicle, the seat comprising:
a seating portion that is adapted to support buttocks and thighs of an occupant of the vehicle, wherein the seating portion includes a seat cushion therein;
a backrest portion that is adapted to support a back of the occupant;
a capacitance sensor that is attached to the seating portion; and
a controller that is installed in the seating portion and configured to apply a voltage to the sensor and to detect a value of an electric current, which passes through the sensor because of the voltage, wherein:
the controller is located in the seat cushion of the seating portion directly below the backrest portion in a vertical direction;
the seat cushion is adapted to support the occupant by resilient force thereof;
the seat cushion includes a first recessed portion in which the controller is accommodated and a second recessed portion in which a portion of the capacitance sensor is accommodated; the second recessed portion being different than the first recessed portion;
the seating portion includes a single piece resilient spacer cushion separately from the seat cushion;
the single piece resilient spacer cushion is disposed within both of said first and second recessed portions and on an upper side of the controller in the vertical direction; and
an upper end surface of the seat cushion and an upper end surface of the spacer cushion in the vertical direction are generally in the same plane.

13. The seat according to claim 12, wherein:
the controller includes a controller main body that is formed generally in a shape of a rectangular parallelepiped;
a corner portion of the main body on a front side of the main body as well as on an upper side of the main body in the vertical direction is chamfered; and
the front side is one side that a backrest surface of the backrest portion faces to, the backrest surface adapted to be in direct contact with the back of the occupant.

14. The seat according to claim 12, wherein:
the sensor includes an electrode portion having an electrode and an extended portion that projects from the electrode portion and is thereby electrically connected between the electrode portion and the controller; and
a thickness of the seating portion in the vertical direction decreases from a front side toward a rear side of the seating portion, given that:
the front side is one side that a backrest surface of the backrest portion faces to, the backrest surface adapted to be in direct contact with the back of the occupant; and
the rear side is an opposite side of the front side.

15. The seat according to claim 12, wherein the controller is formed longer in a width direction thereof than in the other two directions that are perpendicular to the width direction, and the width direction coincides with a right-left direction of the occupant when the occupant is seated on the seating portion.

\* \* \* \* \*